(12) United States Patent
Park et al.

(10) Patent No.: US 6,763,133 B1
(45) Date of Patent: Jul. 13, 2004

(54) MOIRE IMAGE CAPTURING APPARATUS AND METHOD THEREFOR

(75) Inventors: Yoon-Chang Park, Chonan (KR); Kyung-Keun Park, Chonan (KR); Kyung-Min Jeong, Seoul (KR)

(73) Assignees: Sun Moon University, Asan (KR); Intek Engineering Co., Ltd., Seoul (KR); Zcan Co., Ltd., Asan (KR)

( * ) Notice: Subject to any disclaimer, the term of this patent is extended or adjusted under 35 U.S.C. 154(b) by 875 days.

(21) Appl. No.: 09/580,457

(22) Filed: May 30, 2000

(30) Foreign Application Priority Data

May 29, 1999 (KR) ........................................ 1999-19585
May 29, 1999 (KR) ........................................ 1999-19586

(51) Int. Cl.[7] ............................................... G06K 9/00
(52) U.S. Cl. ........................ 382/154; 356/605; 356/616; 356/618
(58) Field of Search ................................ 356/665, 607, 356/608, 616, 618, 619; 382/154

(56) References Cited

U.S. PATENT DOCUMENTS

| | | | | |
|---|---|---|---|---|
| 4,564,295 A | * | 1/1986 | Halioua ...................... 356/605 |
| 4,794,262 A | * | 12/1988 | Sato et al. .................. 356/607 |
| 5,075,560 A | * | 12/1991 | Greivenkamp, Jr. et al. ..... 356/618 |
| 5,075,562 A | * | 12/1991 | Greivenkamp et al. 250/559.05 |
| 5,076,697 A | * | 12/1991 | Takagi et al. ............... 356/603 |
| 5,104,227 A | * | 4/1992 | Uesugi et al. .............. 356/607 |
| 5,135,308 A | * | 8/1992 | Kuchel ....................... 356/604 |
| 5,135,309 A | * | 8/1992 | Kuchel et al. ............. 356/604 |
| 6,084,712 A | * | 7/2000 | Harding ...................... 359/618 |
| 6,291,817 B1 | * | 9/2001 | Kobayashi et al. ..... 250/237 G |
| 6,636,255 B1 | * | 10/2003 | Kobayashi et al. ........... 348/98 |

\* cited by examiner

*Primary Examiner*—Thomas D. Lee
(74) *Attorney, Agent, or Firm*—Bacon & Thomas, PLLC

(57) ABSTRACT

The present invention relates a moiré image capturing apparatus and the related method, the apparatus comprising: an optical projection unit arranged in perpendicular to a reference surface with a light source for illuminating light to the reference surface, where an object is positioned, and a projection grating installed on a optic axis between the light source and the reference surface for projecting the light generated by the light source toward the object; and an optical imaging unit arranged in perpendicular to the reference surface with an imaging lens for making an image with the light reflected at the object and a light receiving part installed on the same optic axis as that of imaging lens for receiving the light passing through the imaging lens to turn into a moiré image, so that a reference grating is removed to make the apparatus in a simpler structure and that a step of removing an image of the reference grating except the moire image having information on figure of the object is not included in the method for capturing the moire image, thereby making a moire image capturing apparatus cheaper in a simpler structure.

6 Claims, 13 Drawing Sheets

MOIRE IMAGE CAPTURING APPARATUS AND METHOD THEREFOR

BACKGROUND OF THE INVENTION

1. Field of the Invention

The present invention relates to a moiré image capturing apparatus and a method therefor for measuring a three-dimensional object through a non-contact optical method by application of a moiré imaging technique.

2. Brief Description of the Prior Art

Generally, a variety of techniques have been widely used for measuring smooth curves of a three-dimensionally shaped object (hereinafter referred to as an object) in a number of fields such as inspection of various products, CAD/CAM, medical science, solid modeling and so on.

Such conventional techniques have been performed by utilization of a contact type of three-dimensional measuring apparatus, with which all the points of curved surfaces of an object have been detected for precise measurement. However, there is a disadvantage in the aforementioned conventional method in that each and every point of three-dimensional curved surfaces of an object should be detected to thereby consume a great deal of time in going over all measuring processes.

In order to solve the aforementioned problem, a so-called moiré imaging technique has been recently developed and used for measuring an object in a non-contact method. The moiré imaging method has an advantage in significantly reducing the time taken for all the measuring steps in comparison with the conventional contact type method for measuring an object.

On the other hand, such a moiré imaging technique includes a step of illuminating light to an object to form a predetermined pitch of striped patterns which makes it possible to obtain a moiré image having three-dimensional shape information on the object. Then, the moiré image goes through a precise actuating procedure.

In the non-contact type device for measuring an object to accomplish the aforementioned moiré imaging method, a glass grating with a pattern of stripes carved on one side surface of the glass and drawn in chrome at a predetermined pitch is projected to the object by an optical projection unit. Also, grating actuating means is needed for actuating the striped glass grating so that striped patterns projected to the object are shifted by a predetermined pitch.

In other words, if the striped glass grating shown in FIG. 1a is projected to the object, a pattern of straight lines is formed on the object as shown in FIG. 1b. Such a pattern of straight lines results in a pattern of curved lines correspondingly to the height of topographical lines to be drawn in accordance with a three-dimensional shape of the object.

On the other hand, if the object drawn with a pattern of curved lines shown in FIG. 1b is overlapped with the striped glass grating shown in FIG. 1a, there appears an image of a pattern of wavy lines, a so-called moiré image. Since such a moiré image is a pattern of topographical lines formed according to different heights of a surface of the object, it is possible to measure the three-dimensional shape of the object through interpretation of the resultant moiré image.

FIG. 2 is a schematic view for illustrating a phase shifting type of a moiré image capturing apparatus, one of the most widely used conventional moiré image capturing devices.

As shown in FIG. 2, the conventional moiré image capturing apparatus includes white light source, a condenser, a projection grating and a projection lens. In addition, a grating actuator is included in the conventional apparatus for actuating projection grating at a predetermined pitch through 3 to 5 steps.

Furthermore, the conventional moiré image capturing apparatus also includes an imaging lens for receiving the light reflected at the object, reference grating identically structured to the projection grating, relay lens and a charge coupled device (hereinafter referred to as CCD) camera array.

In the conventional moiré image capturing apparatus thus constructed, if light illuminated by the white light source is condensed through the condenser and projects the projection grating through the projection lens to the object, the projected grating results in a pattern of striped lines in accordance with the three-dimensional shape of the object as shown in FIG. 1b.

The striped pattern of the object sequentially passes through the imaging lens and relay lens to form an image on the CCD camera. The image formed on the CCD camera, as shown in FIG. 1c, is made by combining an image of the reference grating (refer to FIG. 1a) and a moiré image of the striped pattern (refer to FIG. 1b).

However, in the conventional moiré image capturing device, the moiré image of striped pattern having information on the three-dimensional volume of the object is combined with the image of the reference grating and the resultant image is simultaneously formed on the CCD camera, so that an additional unit is needed for removing the image of reference grating, complicating the structure of the device.

In addition, in order to measure the three dimensional shape of an object with the conventional moiré image capturing apparatus, it is necessary to properly adjust all the measurement specifications to an object such as size, vertical step coverage, measurement precision and so on. A number of projection gratings drawn with various patterns of straight lines with different pitches should be equipped to fully satisfy all the measurement specifications, so as to increase manufacturing and purchasing cost.

There is another disadvantage in the conventional moiré image capturing apparatus in that it is necessary to spend a great deal of time on frequently changing and accurately arranging the glass gratings with different pitches of straight line patterns to meet such a variety of measurement conditions.

Furthermore, there is still another disadvantage in the conventional moiré image capturing apparatus in that it is necessary to include an additional grating actuator for actuating the straight line pattern formed on the glass grating to a desired position, thereby requiring increase in the volume and additional manufacturing cost of the apparatus.

SUMMARY OF THE INVENTION

Therefore, it is an object of the present invention to solve the aforementioned problems and provide a moiré image capturing apparatus constructed in a simpler structure by removing a reference grating, which also offsets a need for removing an image of the reference grating.

It is another object of the present invention to provide a method for capturing a moiré image without using a reference grating.

It is a third object of the present invention to provide a moiré image capturing apparatus which can swiftly and conveniently adjust a pitch of grating patterns and actuate a resultant moiré image with a rotatable polygon mirror controlled by operations of a software program.

It is a fourth object of the present invention to provide a method for capturing a moiré image by swiftly and conveniently adjusting a pitch of grating and actuating the moiré image with a rotatable polygon mirror controlled by operations of a software program.

In order to accomplish the aforementioned object of the present invention, there is provided a moiré image capturing apparatus in accordance with a preferred embodiment of the present invention, the apparatus comprising:

an optical projection unit arranged in perpendicular to a reference surface with a light source for illuminating light to the reference surface, where an object is positioned, and a projection grating installed on a optic axis between the light source and the reference surface for projecting the light generated by the light source toward the object; and an optical imaging unit arranged in perpendicular to the reference surface with an imaging lens for making an image with the light reflected at the object and a light receiving part installed on the same optic axis as that of imaging lens for receiving the light passing through the imaging lens to turn into a moiré image.

In accordance with a first embodiment of the present invention, there is also provided a method for capturing a moiré image, the method comprising the steps of:

letting the light generated by a light source illuminate through a projection grating to an object positioned at a reference surface; and receiving the light reflected at the object through an imaging lens to capture a moire image by a difference in phases of the reference surface and the object.

There is also provided a moiré image capturing apparatus in accordance with a second embodiment of the present invention, the apparatus comprising:

a light source for illuminating light;

polygonal reflecting surfaces rotating means for rotating a plurality of reflecting surfaces at which the light of the light source reflects;

lens means for transforming the spot beam generated by the light source into slit-beam to form a striped pattern;

light traveling route probing means for generating a synchronizing signal by probing a traveling route of the light after reflection at the reflecting surfaces of the polygonal reflecting surfaces rotating means; and control means for controlling an on/off switching period of the light source and a pitch of the striped pattern according to the synchronizing signal of the light traveling route probing means.

There is provided a moire image capturing apparatus in accordance with a third embodiment of the present invention, the apparatus comprising:

a light source for illuminating light;

lens means directly connected with the light source for transforming spot beam of the light source into slit-beam;

polygonal reflecting surfaces rotating means for rotating a plurality of reflecting surfaces to reflect the light illuminated by the light source and lens means and thereby form a striped pattern;

light traveling route probing means for generating a synchronizing signal by probing a traveling route of the light after reflection at the reflecting surfaces of the polygonal reflecting surfaces rotating means; and control means for controlling an on/off switching period of the light source and a pitch of the striped pattern according to the synchronizing signal of the light traveling route probing means.

In accordance with another embodiment of the present invention, there is also provided a method for capturing a moire image, the method comprising the steps of:

transforming spot beam generated by a light source into slit-beam;

allowing the slit-beam to reflect at least one of reflecting surfaces of polygonal reflecting surfaces rotating means that rotates at a high speed; and allowing a pitch of the slit-beam having reflected at the polygonal reflecting surfaces rotating means to change by adjusting an on/off switching period of the light source.

BRIEF DESCRIPTION OF THE DRAWINGS

Objects and aspects of the invention will become apparent from the following description of embodiments with reference to the accompanying drawings in which.

DETAILED DESCRIPTION OF THE INVENTION

Now, preferred embodiments of the present invention will be described in detail with reference to the accompanying drawings.

Figure 3:
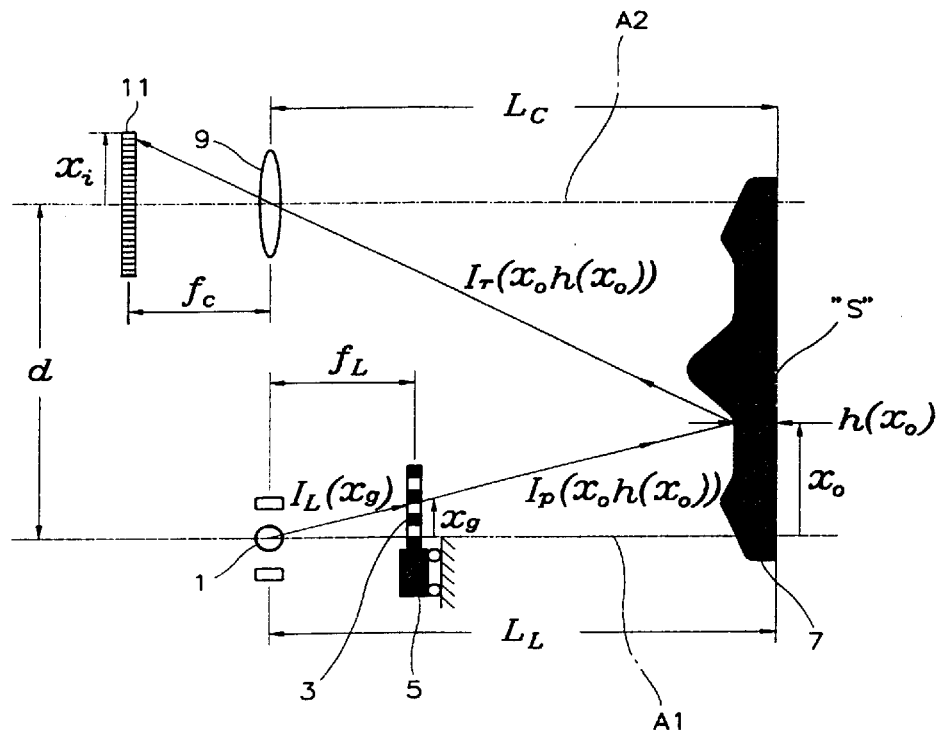
FIG. 3 is a schematic view for illustrating a moiré image capturing apparatus in accordance with the first embodiment of the present invention.

FIG. 3 is a schematic view for illustrating a moiré image capturing apparatus in accordance with the first embodiment of the present invention.

As shown in FIG. 3, there is provided a moiré image capturing apparatus comprising: a light source 1 installed at a position distant by a length ($L_L$) from a reference surface (S) where an object 7 is placed; and a projection grating 3 installed between the reference surface (S) and the light source 1. In other words, an optical projection unit is made up of the light source 1 and the projection grating 3.

The projection grating 3 is connected with projection grating actuating means 5, by which the projection grating 3 can be moved.

At a position distant by a predetermined length from a optic axis (A1) of the optical projection unit having the light source 1 and the projection grating 3, an imaging lens 9 is installed for receiving the light reflected by the object 7 placed at the reference surface (S). In addition, a light receiving part 11 is installed at the same optic axis as that of the imaging lens 9 for receiving the light having passed through the imaging lens 9. In other words, an optical imaging unit is made up of the imaging lens 9 and the light receiving part 11.

At this time, the optic axis (A1) of the optical projection unit having the light source 1 and the projection grating 3 is positioned far from the optic axis (A2) of the optical imaging unit having the imaging lens 9 and the light receiving part 11 according to a predetermined reflection angle.

The distance between the light source 1 and the reference surface (S) is identical to that between the imaging lens 9 and the reference surface (S). The optic axis (A1) of the optical projection unit and the optic axis (A2) of the optical imaging unit is in perpendicular to the reference surface (S).

At this time, it is preferable that the light source 1 is made of small, lightweight and cheap semiconductor laser device so-called "laser diode", or white-light source such as tungsten-halogen lamp, and the light receiving unit 11 is made of a two-dimensional image sensor such as a CCD camera. The imaging lens 9 is made of commonly used lens.

Figure 4:
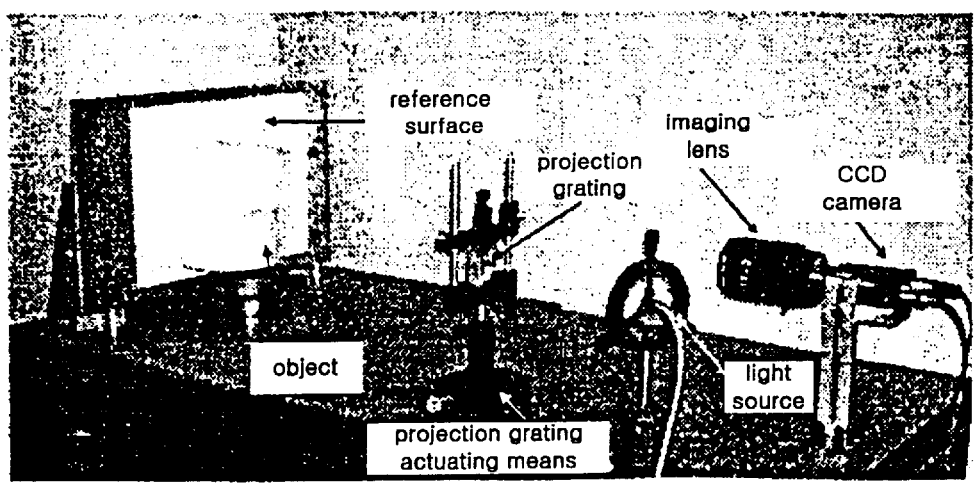
FIG. 4 is a picture for illustrating an experimental moiré image capturing apparatus in accordance with the first embodiment of the present invention.

On the other hand, as shown in FIG. 4, the moiré image capturing apparatus constructed in accordance with the first embodiment of the present invention is made into an experimental apparatus to solve the aforementioned problems of the conventional apparatus and achieve desired functions and effects.

At this time, the experimental apparatus includes XC-75 black and white CCD camera made in SONY as the CCD camera, S6X11 TV zoom lens made in SPACECOM as the imaging lens, binary grating having a pitch (g) of 0.92 mm as the projection grating, and a DT3155 black and white frame grabber in resolution of 640×480 made in DATA TRANSLATION as frame grabber.

In the apparatus constructed as above mentioned, the light generated by the light source 1 illuminates through the projection grating 3 to the object 7. Then, after reflection at the object 7, the light travels back through the imaging lens 9 to the light receiving part 11 to form an image.

At last, a moiré image captured in a three-dimensional shape is made at the light receiving part 11. At this time, the projection grating actuating means 5 moves at a predetermined pitch, thereby accomplishing algorithms like 3, 4, 5 or n buckets.

Now, all the steps for capturing a moiré image with the first embodiment of the present invention will be described in detail.

At first, along the optic axis of the light source 1, the distance between the light source 1 and projection grating 3 and the distance between the light source 1 and the reference surface S are respectively designated $f_L$ and $L_L$. Also, along the optic axis of the light receiving part 11 of the CCD camera, the distance between the plane surface of an image formed on the light receiving part 11 and imaging lens 9 and the distance between the imaging lens 9 and the reference surface (S) where the object 7 is positioned are respectively designated by $f_c$ and $L_c$. Perpendicular distances between an arbitrary point of the plane surface of an image formed on the light receiving part 11 and the optic axis A2 and the perpendicular distances between an arbitrary point of the projection grating 3 and the optic axis A1 are respectively designated by $x_i$ and $x_g$.

The light of the light source 1 passes a point $x_g$ of the projection grating 3 and reaches a point $(x_o, h(x_o))$ of the object 7. Then, the light reflects at the object 7 and travels through the center of the imaging lens 9 to a point $x_i$ of the plane surface of the image formed on the light receiving part 11.

At this time, a transmission factor T of the projection grating 3 having a pitch (g) can be shown in a mathematical formula 1 as follows:

$$T(x_g) = 1 + \cos\left(\frac{2\pi}{g}(x_g + \Delta)\right) \quad (1)$$

where, $\Delta$ is an initial position of the projection grating 3.

When brightness of the light arriving at one point $x_g$ of the projection grating 3 is designated by $I_L(x_g)$, the brightness $I_p(x_o, h(x_o))$ of the light arriving at one point $(x_o, h(x_o))$ of the object 7 through the projection grating 3 can be indicated in mathematical formula 2 as follows:

$$I_p(x_0, h(x_0)) = I_L(x_g)T(x_g) = I_L(x_g)\left[1 + \cos\left(\frac{2\pi}{g}(x_g + \Delta)\right)\right] \quad (2)$$

Also, geometrical relationship of mathematical formula 2 is indicated in mathematical formula 3 as follows:

$$\frac{x_g}{f_L} = \frac{x_0}{L_L - h(x_0)} \quad (3)$$

Therefore, one point $x_g$ of the projection grating 3 is indicated in mathematical formula 4 as follows:

$$x_g = f_L \frac{x_0}{L_L - h(x_0)} \quad (4)$$

The brightness $I_p(x_o, h(x_o))$ of the light arriving at the object 7 through the projection grating 3 is indicated in mathematical formula 5 as follows:

$$I_p(x_0, h(x_0)) = I_L(x_g)\left[1 + \cos\left(\frac{2\pi}{g}\left(\frac{f_L x_0}{L_L - h(x_0)}\right) + \Delta\right)\right] \quad (5)$$

When reflection rate of the object 7 at $(x_o, h(x_o))$ is indicated as $R(x_o, h(x_o))$, the brightness $I(x_i)$ of the light arriving at the one point $x_i$ of the plane surface of the image formed on the light receiving part 11 can be indicated in mathematical formula 6 as follows:

$$I(x_i) = R(x_0, h(x_0)) I_p(x_0, h(x_0)) \quad (6)$$

Also, geometrical relationship of mathematical formula 6 is indicated in mathematical formula 7 as follows:

$$\frac{x_i}{f_c} = \frac{d - x_0}{L_c - h(x_0)} \rightarrow x_0 = d - \frac{x_i}{f_c}(L_c - h(x_0)) \quad (7)$$

At this time, the brightness $I(x_i)$ of the light arriving at one point $x_i$ of the image plane of the light receiving part 11 is indicated in mathematical formula 8 as follows:

$$I(x_i) = A_i\left[1 + \cos\left(\frac{2\pi}{g}\left(\frac{f_L}{L_L - h_i}\left(d - \frac{x_i}{f_c}(L_c - h_i) + \Delta\right)\right)\right)\right]$$

$$= A_i\left[1 + \cos\left(\frac{2\pi}{g}\left(\frac{f_L d}{L_L - h_i} - \frac{f_L}{f_c}\frac{L_c - h_i}{L_L - h_i}x_i + \Delta\right)\right)\right] \quad (8)$$

where $A_i = R(x_o, h(x_o)) I_p(x_g)$, $h_i = h(x_o)$

Where, in case of $L_L = L_c = L$, $f_L = f_c = f$, the mathematical formula 8 is also indicated in mathematical formula 9 as follows:

$$I(x_i) = A_i\left[1 + \cos\left(\frac{2\pi}{g}\left(\frac{fd}{L - h_i} - x_i + \Delta\right)\right)\right] \quad (9)$$

$$\frac{fd}{L - h_i} - x_i = \frac{fd}{L - h_i} - \frac{fd}{L} + \frac{fd}{L} - x_i = \frac{fd/L}{L - h_i}h_i + \left(\frac{fd}{L} - x_i\right)$$

At this time, $$\frac{fd}{L} - x_i = x_i'$$

results in mathematical formula 10 as follows:

$$I(x_i) = A_i\left[1 + \cos\left(\frac{2\pi}{g}\left(\frac{\frac{fd}{L}h_i}{L - h_i} + x_i' + \Delta\right)\right)\right] \quad (10)$$

Therefore, it is possible to show a changed pattern of grating in accordance with the mathematical formula 10.

According to the mathematical formula 10, it can be confirmed that information $h_i$ on the height of the object 7 is included in the changed pattern of grating.

On the other hand, according to the conventional moiré technique, the moiré phase $\phi_{im}$ related to only information about height of an object can be obtained by a reference grating installed at the front surface of the light receiving part in mathematical formula 11 as follows.

$$\phi_{im} = \frac{2\pi}{g}\frac{\frac{fd}{L}h_i}{L - h_i} \quad (11)$$

Next, there will be descriptions about all the steps of capturing a moiré image only with the changed pattern of grating, without utilization of the reference grating 3.

If there is any other external illuminating means in addition to the light source 1, like in the general moiré image capturing device, the brightness $I_{ij}$ of the pattern of grating changed in relation to $\Delta = \Delta_j$ can be indicated in mathematical formula 12 as follows:

$$I_{ij} \equiv I(x_i)|_{\Delta = \Delta_j} = M_i + N_i \cos\left(\varphi_i + \frac{2\pi}{g}\Delta_j\right) \quad (12)$$

where $$\varphi_i = \frac{2\pi}{g}\left(\frac{d/m}{L - h_i}h_i + x_i'\right), m \equiv \frac{L}{f}$$

Where, $M_i$ and $N_i$ are respectively background brightness and contrast of the changed pattern of grating.

On the other hand, $\phi_i$ having the information about the shape of an object is indicated with measurable phases $\overline{\phi}_i(-\pi < \overline{\phi}_i \leq \pi)$ and positive number n in mathematical formula 13 as follows:

$$\varphi_i = \frac{2\pi}{g}\left(\frac{d/m}{L - h_i}h_i + x_i'\right) = \overline{\varphi}_i + 2\pi n \quad (13)$$

Where, assuming that $h_i$ is 0, a reference phase $$\varphi_{ir}\left(\equiv \varphi_i|_{h_i = 0} = 2\pi\frac{x_i'}{g}\right)$$

can be obtained with an image made on the reference surface, and a phase $\phi_{io}$ of an object with a predetermined height $h_i$ installed on the reference surface can be also obtained.

As a result, a final phase $\phi_{im}$ of an object defined as a difference of the two phases relates to a phase $\phi_{im}$ of the moire image shown in the mathematical formula 11, and their relationship is indicated in mathematical formula 14 as follows:

$$\varphi_{im} \equiv \varphi_{io} - \varphi_{ir} = \frac{2\pi}{g}\frac{(d/m)h_i}{L - h_i} = \frac{2\pi}{g}\frac{\frac{fd}{L}h_i}{L - h_i} = \varphi_{im} \quad (14)$$

As described above, (the phase of) the moire image has been captured without the reference grating 3 in accordance with the first embodiment of the present invention.

Next, all the steps for measuring an object, for instance, a plaster figure of a man's lips are described in accordance with the aforementioned method.

Figure 5A:
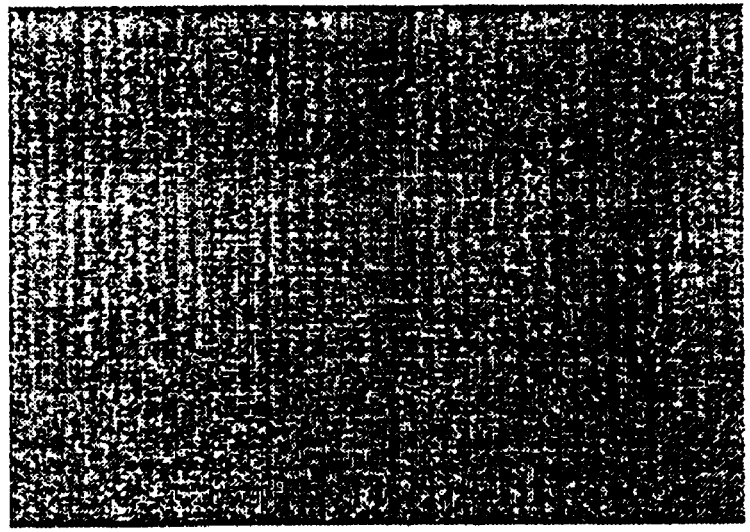
FIGS. 5a and 5b are pictures for respectively illustrating an image of grating patterns captured by CCD camera, the image being projected to the reference surface by the experimental moiré image capturing apparatus shown in FIG. 4, and an image of projection grating projected to the object.
Figure 5B:
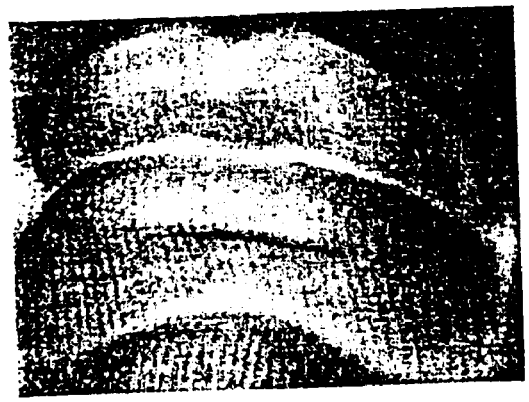

In other words, FIG. 5a illustrates an image of a grating projected to the reference surface S and captured by the light receiving part 11, and FIG. 5b illustrates an image of projection grating 3 projected to the object, a plaster figure of a man's lips.

The phases of images shown in the FIG. 5a and FIG. 5b are respectively calculated with 4 bucket algorithm shown in mathematical formula 15 as follows:

$$\varphi_i = \tan^{-1}\left(\frac{I_{i1} - I_{i3}}{I_{i0} - I_{i2}}\right) \quad (15)$$

Where $\Delta_j$=0, g/4, g/2, 3g/4.

Figure 6A:
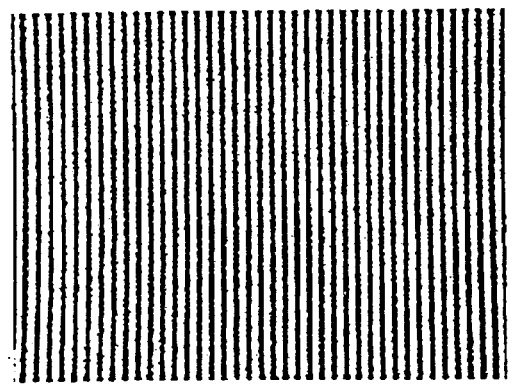
FIGS. 6a through 6c respectively illustrate image projected to the reference surface, phase of all points of the object and phase of the moiré image.
Figure 6B:
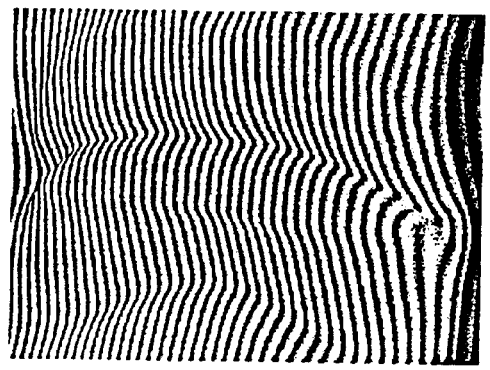
Figure 6C:
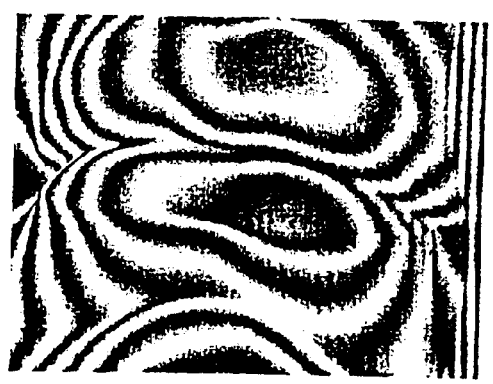

Also, FIG. 6a indicates a phase $\overline{\phi_{ir}}$ of the reference surface S, and FIG. 6b indicates a phase $\overline{\phi_{io}}$ of the object 7. FIG. 6c indicates a moiré image (phase) $\overline{\phi_{im}}(=\overline{\phi_{io}}-\overline{\phi_{ir}})$ calculated by a difference between the phase of the reference surface S and the phase of the object 7.

Figure 1A:
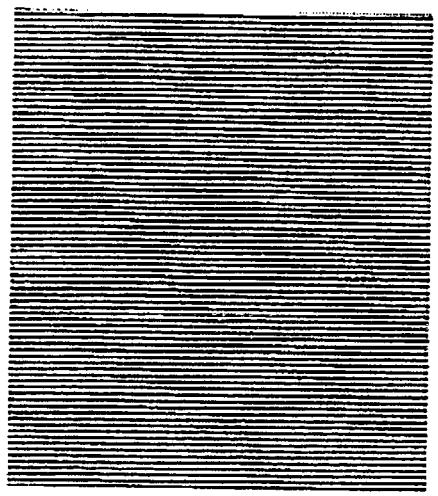
FIGS. 1a through 1c are drawings for illustrating steps of capturing a moiré image with a conventional moiré imaging technique.
Figure 1B:
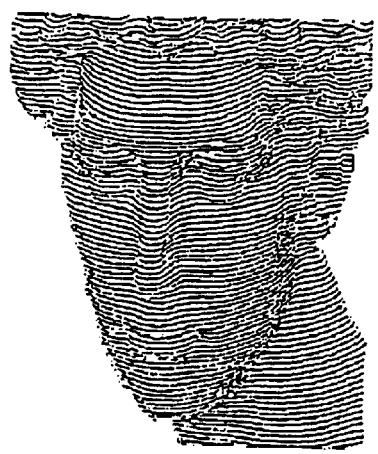
Figure 1C:
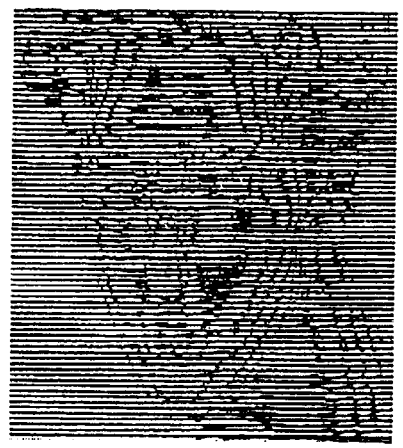
Figure 2:
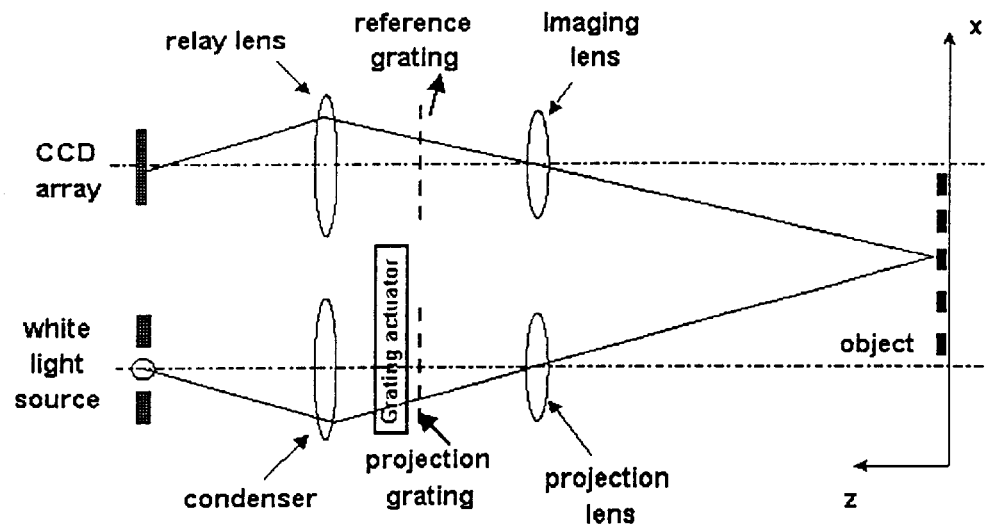
FIG. 2 is a schematic view for illustrating a conventional moiré image capturing apparatus.

As shown in FIG. 6c, the moiré image captured in accordance with the present invention, there is only a pattern of contour lines revealing the height (height from the reference surface) of the object 7, but no image (refer to FIG. 1c) of the reference grating obtained by the prior art.

In other words, it becomes possible to capture only an image by measuring the height of the object 7 without additional means for removing the reference grating image in accordance with the first embodiment of the present invention.

Then, a second embodiment of the present invention will be described in detail with reference to the accompanying drawings.

Figure 7:
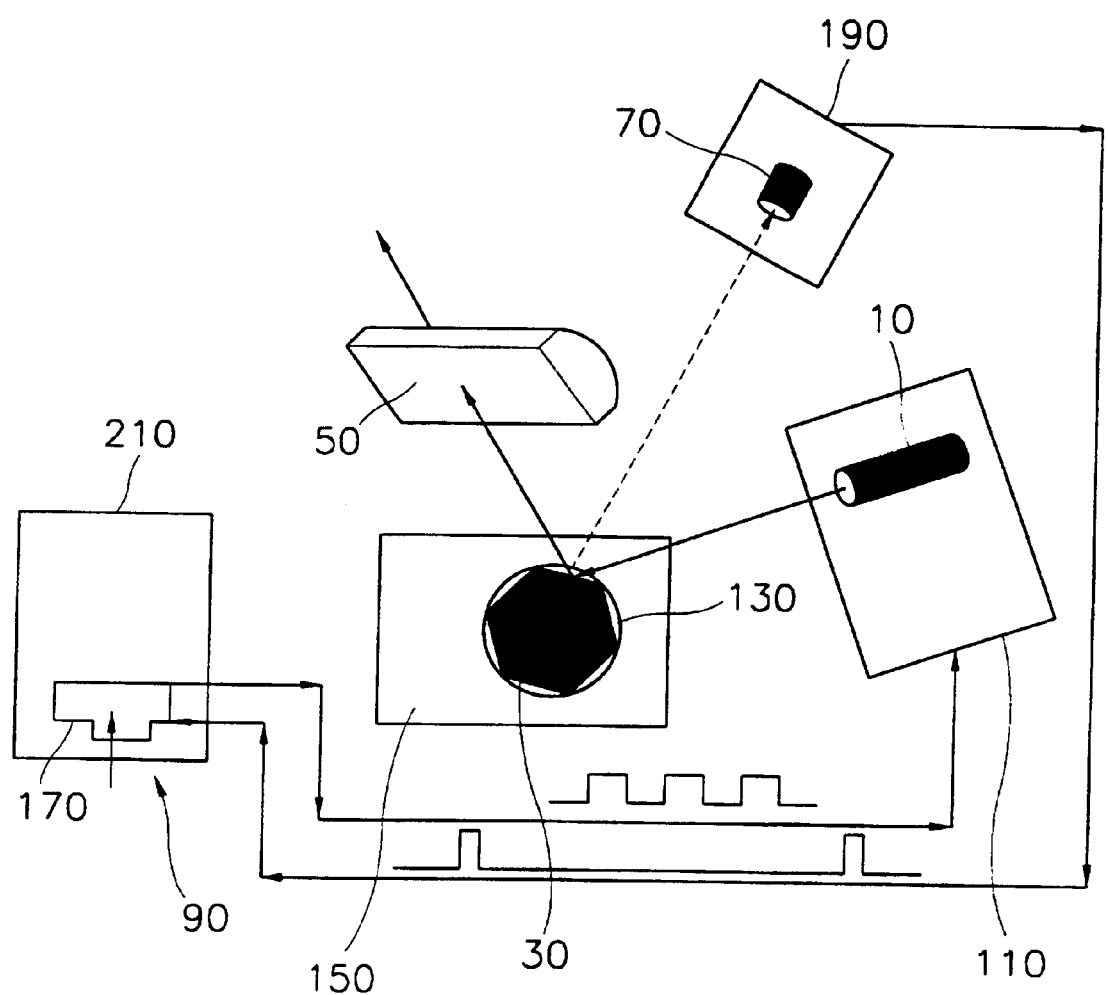
FIG. 7 is a structural view for illustrating a moiré image capturing apparatus in accordance with a second embodiment of the present invention.

FIG. 7 illustrates a moiré image capturing apparatus in accordance with the second embodiment of the present invention.

As shown in FIG. 7, the moire image capturing apparatus comprises: a light source 10; a rotatable polygon mirror 30 with a plurality of surfaces for reflecting the light illuminated by the light source 10; a cylindrical lens 50 for transforming spot beam reflected by the rotatable polygon mirror 30 into slit-beam; light receiving part 70 for generating synchronizing signals by probing light traveling routes after reflection at the polygon mirror 30; and control means 90 for controlling a on/off switching period of the light source 10 and a pitch of striped patterns according to the synchronizing signals generated by the light receiving part 70.

At this time, the light source 10 is small, lightweight and cheap laser diode that generates laser beam of spot beam.

Because the laser diode adapted to light source 10 is a semiconductor device, the light generating capacity increases when temperature gets low, but the light generating capacity de creases when temperature gets high. A light source driver 110 is attached at the side of the light source 10 to continuously detect fluctuations of laser output and driving current according to such differences in temperature and keep high laser output efficiency.

Furthermore, the light source driver 110 includes inversion amplifier and buffer and is a widely known circuit that is controlled by the control means 90 to keep consistent strength of laser beam.

In addition, a condensing lens (not shown) is integrally coupled at a part where the spot beam is illuminated by the light source 10 for condensing and directing the diffusive light toward the rotatable polygon mirror 30.

The polygon mirror 30 which boundary surface is constructed with a plurality of surfaces rotates at a high speed, so that the light of the light source 10 is reflected at different angles in response to changes in angles of the reflecting surfaces.

Besides, the polygon mirror 30 is connected with a spindle motor 130 rotating at a constant speed. The spindle motor 130 is connected with a motor driver 150 having a power supply for supplying consistently power to the motor.

The cylindrical lens 50 is designed for transforming the spot beam generated by the light source 10 and reflected by the polygon mirror 30 into slit-beam, which further travels to the object for measurement.

A number of light travelling routes is formed when one reflecting surface of the polygon mirror 30 reflects spot beam of the light source 10. The light receiving part 70 detects light of a last light travelling route out of all the effective light travelling routes used for forming the striped pattern. The light receiving part 70 is made of a photo diode.

The control means 90 includes: a computer 210 having a time controlling driver 170 for controlling an on/off switching period of the-light source 10 for generation of light; and a light receiving part controlling driver 190 connected with the light receiving part 70 for outputting a signal to indicate completion of light reflection at one reflecting surface of the polygon mirror 30.

The light receiving part controlling driver 190 is designed for generating a synchronizing signal on the basis of a detection signal generated by the light receiving part 70 and outputting the synchronizing signal to the time controlling driver 170.

The time controlling driver 170 is mounted at an ISA (Industry Standard Architecture) slot of the computer 210 for being driven to generate an on/off switching signal by a dedicated software program installed in the computer 210 and outputting it to a light source controlling driver 110.

The computer 210 is driven by a dedicated software program installed in the hard disk to control all the general adjustments about an on/off switching period of light source and striped pattern generating/delaying period in accordance with the present invention.

In the moire image capturing apparatus constructed in accordance with the second embodiment of the present invention, if spot beam of the light source 10 reflects at the reflecting surfaces of the polygon mirror 30 rotating at a high speed, the spot beam having reflected at the polygon mirror 30 transforms into slit-beam after passing through the cylindrical lens 50. In other words, spot beam generated by the light source 10 according to the on/off switching period passes through the cylindrical lens 50 and transforms into slit beam to illuminate to an object, so that slit-beam results in a striped pattern having a predetermined pitch.

Operational effects of the moire image capturing apparatus will be described in detail in accordance with the second embodiment of the present invention with reference to the accompanying drawings.

Figure 8A:
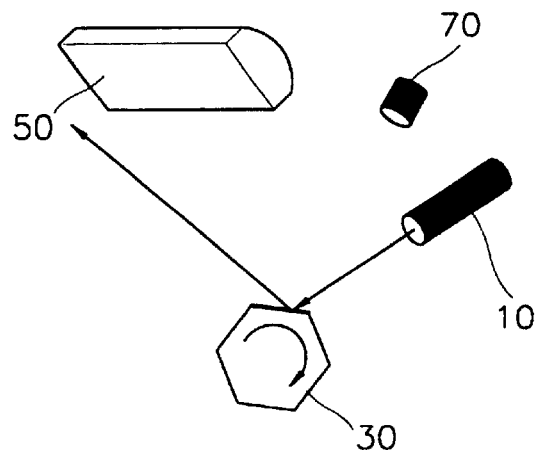
FIGS. 8a through 8c illustrate the states of light traveling routes according to the changes in the positions of reflecting surfaces of the rotatable polygonal mirror shown in FIG. 7.
Figure 8B:
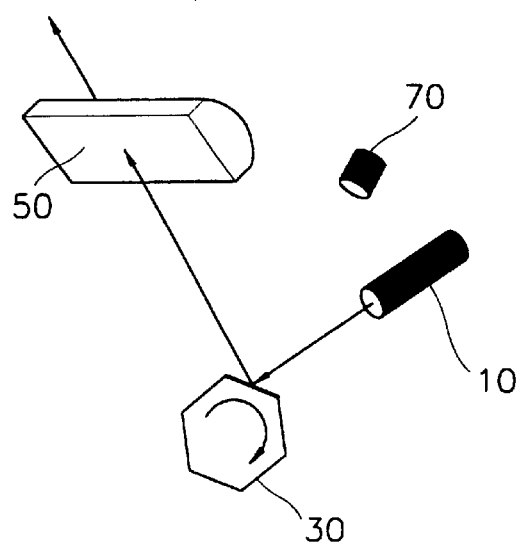
Figure 8C:
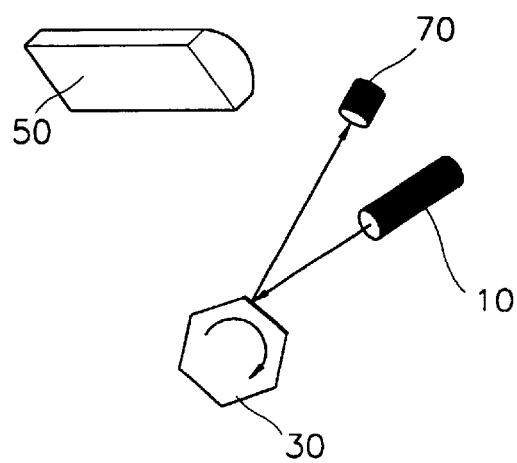

At first, the spot beam generated by the light source 10 reflects at respective reflecting surfaces of the polygon mirror 30, which rotates at a high speed, along light travelling routes designated in arrows as shown in FIGS. 8a through 8c.

At this time, if an incident angle of the light entering a reflecting surface of the polygon mirror 30 is large, the light reflecting at the reflecting surface of the polygon mirror 30 diverts to the left of the cylindrical lens 50 as shown in FIG. 8a.

However, if an incident angle of the light entering a reflecting surface of the polygon mirror 30 gets smaller, the light reflecting at the reflecting surface of the polygon mirror 30 transforms from the spot beam into the slit-beam, while passing through the cylindrical lens 50, so as to illuminate to an object for measurement as shown in FIG. 8b.

Next, if an incident angle of the light entering a reflecting surface of the polygon mirror 30 is small, the light reflected at the reflecting surface of the polygon mirror 30 diverts to the right of the cylindrical lens 50 as shown in FIG. 8c.

On the other hand, among effective light travelling routes, a last light travelling route of the light which has diverted to the right of the cylindrical lens 50 after reflection at the reflecting surface of the polygon mirror 30 enters the light receiving part 70. At this time, the light receiving part controlling driver 190 generates a synchronizing signal in synchronization with the light of the last light travelling route detected by the light receiving part 70.

Figure 9:
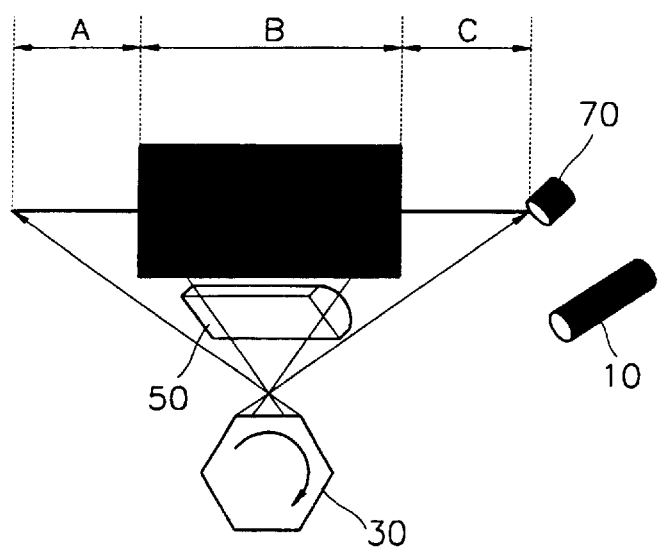
FIG. 9 illustrates a state of light illuminating to a reference plane surface after the light is reflected by the reflecting surfaces of the rotatable polygonal mirror shown in FIG. 7.

As a result, the light reflecting at a reflecting surface of the polygon mirror 30, as shown in FIG. 9 enters the plane shape of an object.

In the other words, the light having reflected according to various reflecting angles changed by high speed rotations of the polygon mirror 30 passes through the cylindrical lens 50 and turns into continuous slit-beam as designated by a thick rectangular shape B. On the other hand, the light having not passed through the cylindrical lens 50 is shown in a thin straight line A and C because the spot beam of the light source 10 projects as it is.

Figure 10:
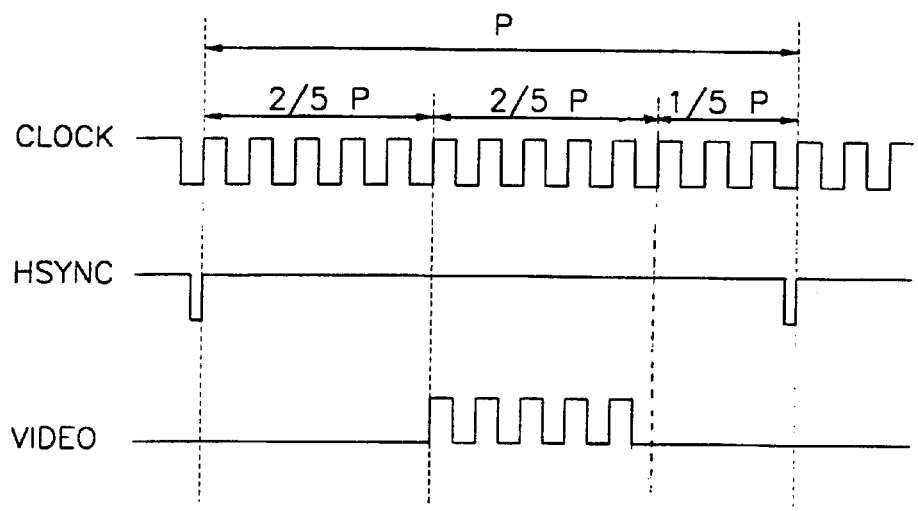
FIG. 10 is a timing diagram for illustrating an on/off switching signal period of the light source to illuminate to the reference plane surface shown in FIG. 9.
Figure 11:
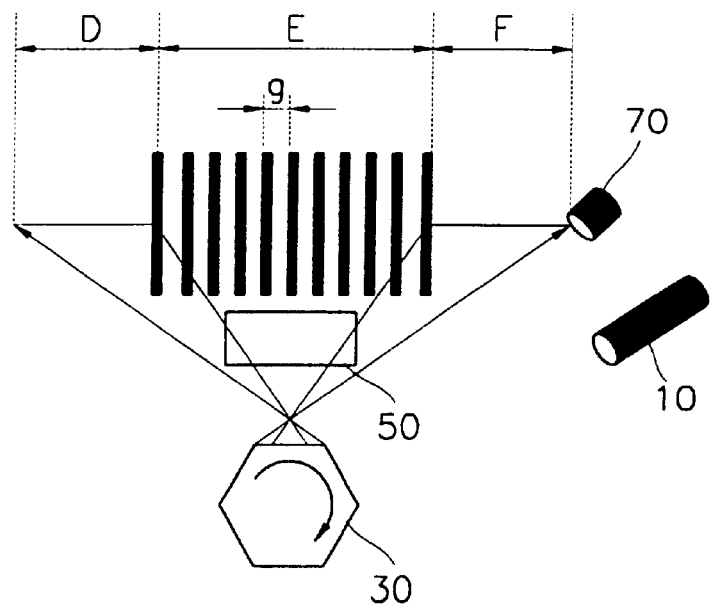
FIG. 11 illustrates a step of forming slit-beam on the reference plane surface by the light reflected at the rotatable polygon mirror according to on/off switching of the light source at the period of a signal shown in FIG. 10.

The slit-beam B of rectangular shape and the spot beam A and C of straight lines determine a striped pattern region E and straightly lined pattern regions D and F shown in FIG. 11 by adjusting the on/off switching period of the light source 10 on the basis of the timing diagram shown in FIG. 10.

As shown in FIG. 10, the time controlling driver 170 regards clock signals CLOCK, which have been input by the computer 210 during a period of simultaneous signals HSYNC generated by the light receiving part controlling driver 190, as a reference signal and generates switching signals VIDEO to switch on/off the light source 10.

At this time, an effective range formed on the reflecting surface of the polygon mirror 30 during one period P of the synchronizing signal HSYNC, that is, the striped pattern region E will be measured.

On the other hand, the synchronizing signal HSYNC generated by the light receiving part controlling driver 190 normally maintains a transistor-transistor logic (TTL) high level, for example, DC 4.2V and falls to a TTL low level, for example, DC 0.8V when the light receiving part 70 receives the light.

Also, the switching signals VIDEO generated by the time controlling driver 70 turn on the light source 10 at a TTL high level and turn off the light source at a TTL low level.

As shown in FIG. 11, the striped pattern region E is made up of a plurality of slit-beam. The computer 210 initiates operations of the dedicated software program to drive the time controlling driver 170. Accordingly, the on/off switching period of the signals VIDEO is changed to increase or decrease the pitch g of striped patterns of the slit-beam.

Figure 12:
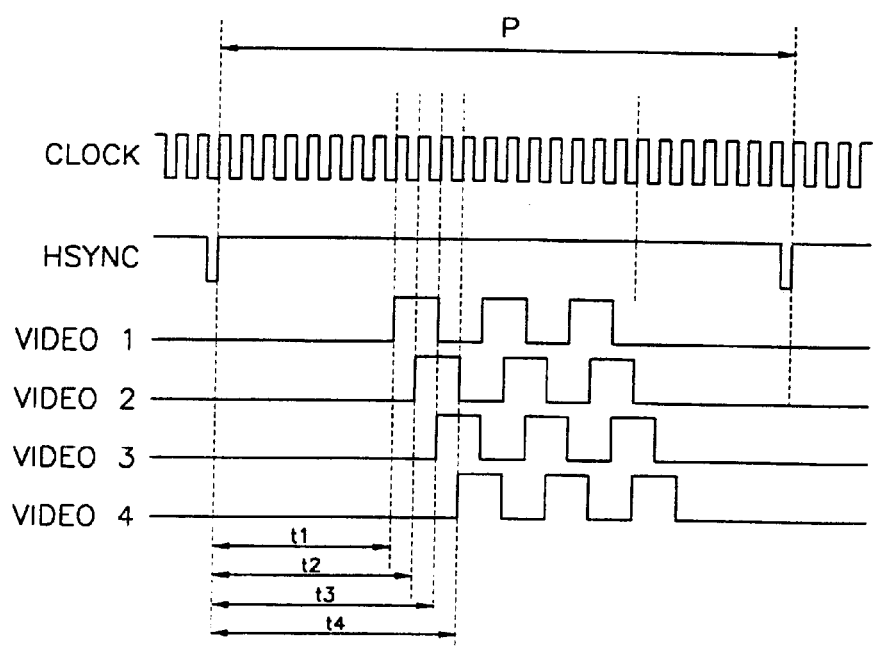
FIG. 12 is a timing diagram of signals for actuating grating patterns according to the delay in switching time of the light source.

In addition, the software program of the computer 210 drives the time controlling driver 170 to delay generation of the signals VIDEO to be supplied to the light source 10. In other words, as shown in FIG. 12, it is possible to selectively generate the first through fourth signals VIDEO 1 through VIDEO 4 correspondingly to the first through fourth time delay interval t1 through t4 at a TTL low level of the synchronizing signal HSYNC.

Figure 13:
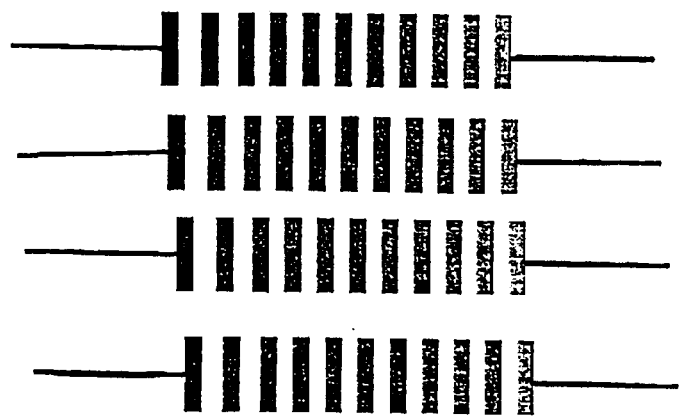
FIG. 13 illustrates grating patterns actuated according to a delayed switching time shown in FIG. 12.
Figure 14:
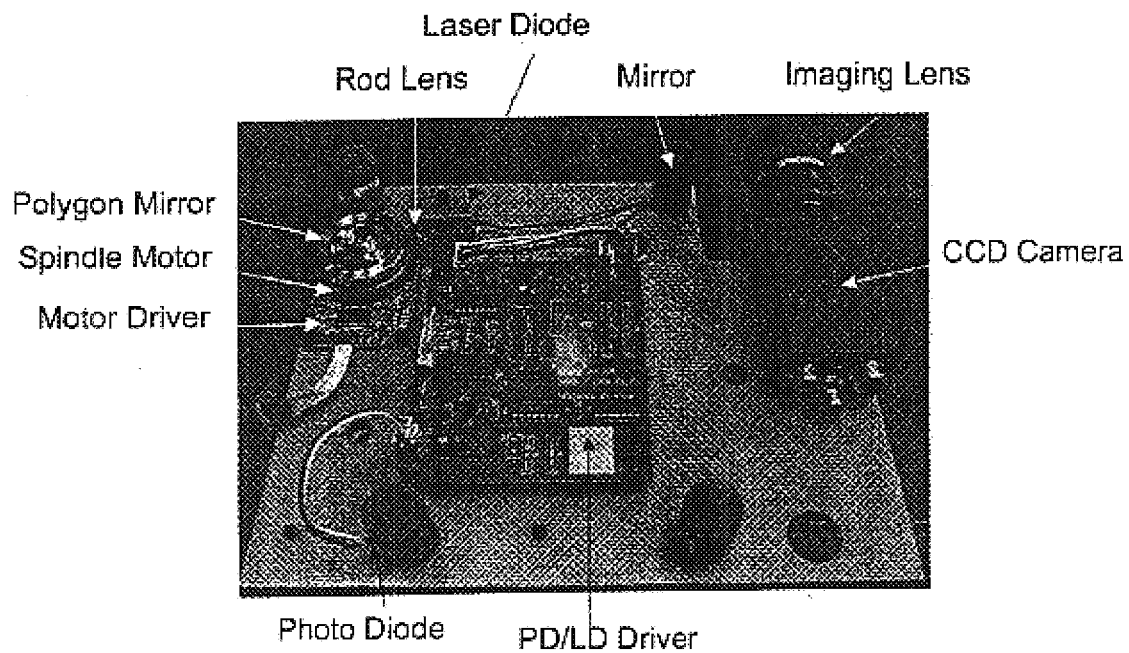
FIG. 14 illustrates a moiré image capturing apparatus actually constructed in accordance with the second embodiment of the present invention.

In consequence, as shown in FIG. 13, the ranges of the striped patterns moves correspondingly to the first through fourth signals VIDEO 1 through VIDEO 4 having the first through fourth time delay ranges t1 through t4.

On the other hand, because width, pitch, vertical length and brightness of the striped patterns and distance to the object forming the striped patterns are all closely co-related, a desired specification of the apparatus can be accomplished by controlling wave length and output of the light source, number of reflecting surfaces and rotational speed of the polygon mirror, specifications of the cylindrical lens and so on.

Next, a third embodiment of the present invention will be described with reference to the accompanying drawings.

Figure 15:
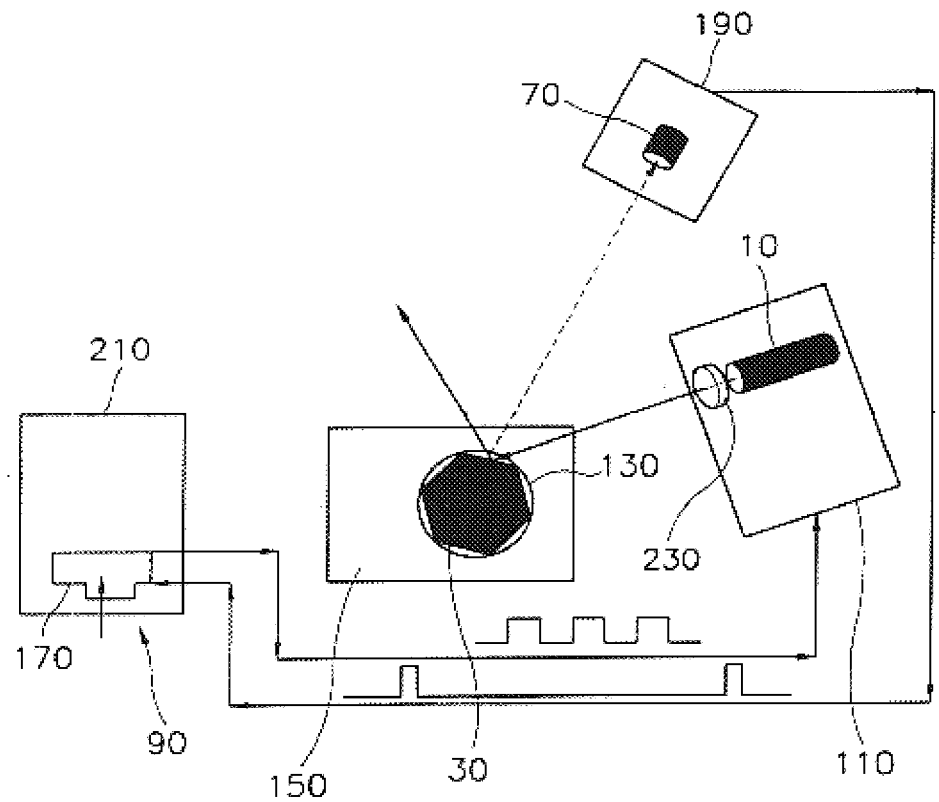
FIG. 15 illustrates a moiré image capturing apparatus constructed in accordance with the third embodiment of the present invention.

FIG. 15 is a view for illustrating a moiré image capturing apparatus in accordance with the third embodiment of the present invention. Same reference numerals are applied to the same parts in the third embodiment of the present invention as those in the second embodiment of the present invention shown in FIG. 7 and detailed descriptions for them will be omitted.

As shown in FIG. 15, the third embodiment of the present invention similar to the aforementioned second embodiment comprises: a light source 10 integrally coupled with condensing lens for generating spot beam; a rotatable polygon mirror 30 with a plurality of surfaces for reflecting the light generated by the light source 10; a light receiving part 70 for generating a synchronizing signal by probing a light travelling ling route after reflection at the polygon mirror 30; and control means 90 for controlling an on/off switching period of the light source 10 and a pitch of a grating pattern in synchronization with the synchronizing signal of the light receiving part 70.

In the second embodiment of the present invention, the cylindrical lens 50 is installed at one side of the polygon mirror 30 for transforming the spot beam generated by the light source 10 and reflected at a reflecting surface of the polygon mirror 30 into slit-beam.

However, a cylindrical lens 230 is coupled with a condensing lens at the front side of the light source 10, where spot beam is generated, in the third embodiment of the present invention.

If the cylindrical lens 230 is installed at the front side of the light source 10, it is not necessary to increase the diameter of the cylindrical lens for transforming the spot beam into the slit-beam while the reflecting surfaces of the polygon mirror 30 are rotating. Therefore, a small diameter of the lens makes it possible to reduce manufacturing cost and produce a smaller apparatus.

In other words, according to the third embodiment of the present invention, the spot beam generated by the light source 10 is condensed through the condensing lens 230 and is transformed into the slit-beam after passing through the cylindrical lens 230. The slit-beam reflects at reflecting surfaces of the polygon mirror 30 rotating at high speed and travels to the object. Meanwhile, the light receiving part 70 receives slit-beam of the last effective light travelling route.

Accordingly, a plurality of slit-beam illuminate to the object and form a region of a striped pattern on the object.

The light receiving part controlling driver 190 generates a synchronizing signal along with operations of the light receiving part 70 and then outputs it to the time controlling driver 170 of the control means 90. On the other hand, the computer 210 of the control means 90 drives the time controlling driver 170 by the dedicated software program to thereby selectively controlling width, pitch, vertical length and brightness of slit-beam and distance to an object to form striped patterns.

In the second and third embodiments of the present invention operated in the aforementioned method, it is possible that light is illuminated to an object through the polygon mirror and the cylindrical lens and then the light reflected at the object travels through an imaging lens to light receiving part shown in the first embodiment of the present invention. As a result, a moire patterned image is captured by a difference in phases of reference surface and the object.

Figure 16:
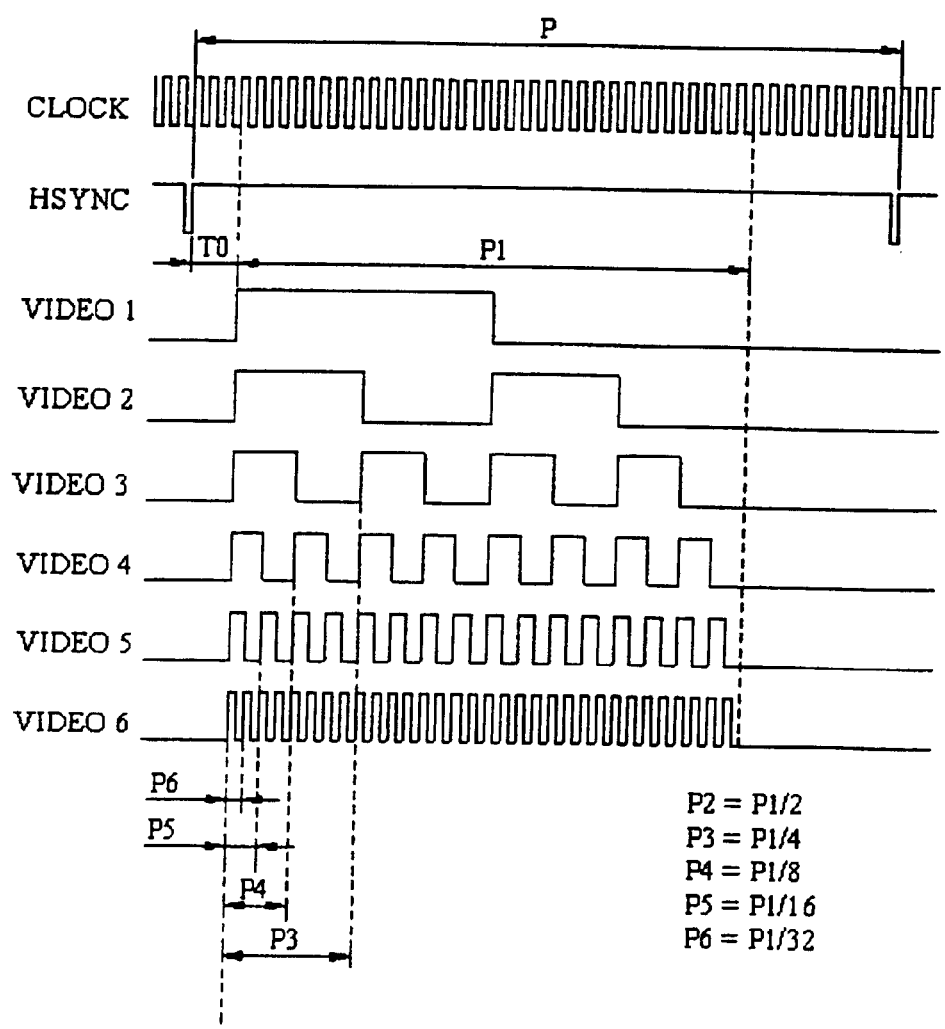
FIG. 16 is a timing diagram for illustrating an instance where a stripe patterning device is applied to a space coding method.

On the other hand, in this invention constructed as above mentioned it is possible to generate grating patterns having various pitches by adjusting a generation period of grating without additional components. FIG. 16 illustrates on/off switching signals VIDEO1~VIDEO6 for generating grating patterns having various pitches in synchronization with clock signals CLOCK and synchronizing signals HSYNC.

Figure 17:
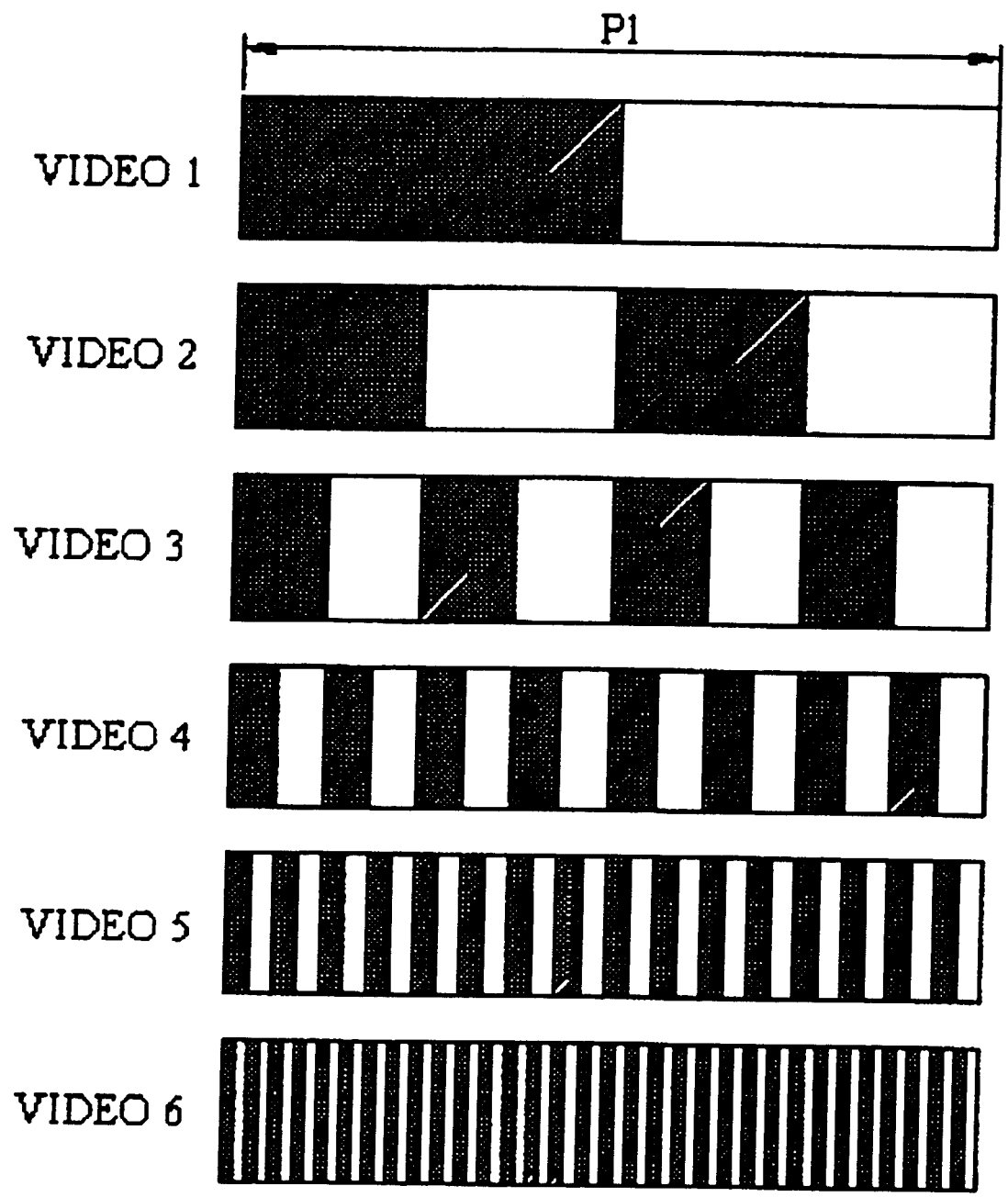
FIG. 17 illustrates the shapes of grating generated by the space coding method as shown in FIG. 16.

In the present invention, grating patterns having various periods shown in FIG. 16 are projected to an object and the resultant projection image is interpreted to measure a three dimensional image of the object, thereby making it possible to apply a so-called "binary coding method". In consequence, a variety of grating patterns having different pitches can be applied in the binary coding method as shown in FIG. 17.

Having described a method of the present invention, it is to be understood that various changes and modifications may be effected therein by one skilled in the art without departing from the scope or spirit of the invention. For instance, while a cylindrical lens is used for transforming spot beam of a light source into split-beam in the aforementioned embodiments, another type of lens means such as a rod lens can also be applied to the present invention.

As described above, there are advantages in the moire image capturing apparatus and the related method of the present invention in that reference grating is removed to make the apparatus in a simpler structure and that a step of removing an image of the reference grating except the moiré image having information about shape of the object is not included in the method for capturing the moire image, so that the moiré image capturing apparatus is cheaper in a simpler structure.

Furthermore, there are advantages in the moiré image capturing apparatus and the related method of the present invention in that simple manipulation of a computer software program can swiftly and conveniently adjust pitches of striped patterns according to measurement specifications of an object and that no additional unit is needed for actuating the striped patterns of the object, thereby accomplishing structural simplification and reducing manufacturing cost.

What is claimed as:

1. A moiré image capturing apparatus comprising:
   an optical projection unit arranged in perpendicular to a reference surface with a light source for illuminating light to the reference surface, where an object is positioned, and a projection grating installed on an optic axis between the light source and the reference surface for projecting the light generated by the light source toward the object; and
   an optical imaging unit arranged in perpendicular to the reference surface with an imaging lens for making an image with the light reflected at the object and a light receiving part installed on the same optical axis as that of the imaging lens for receiving the light passing though the imaging lens to turn into a moiré image,
   wherein the light source and the imaging lens are arranged at the same length far from the reference surface.

2. A moiré image capturing apparatus comprising:
   a light source for illuminating light;
   polygonal reflecting surfaces rotating means for rotating a plurality of reflecting surfaces at which the light of the light source reflects;
   lens means for transforming a spot beam generated by the light source into a slit-beam to form a striped pattern;
   light traveling route probing means for generating a synchronizing signal by probing a traveling route of the light after reflection at the reflecting surfaces of the polygonal reflecting surfaces rotating means; and
   control means for controlling an on/off switching period of the light source and a pitch of the striped pattern according to the synchronizing signal of the light traveling route probing means.

3. The apparatus of claim 2, wherein the control means comprises:
   a time controlling driver driven to adjust an on/off switching period of the light source and a pitch of the striped pattern;
   a computer having a software program to control operations of the time controlling driver.

4. The apparatus of claim 2, wherein the control means adjusts an on/off switching period of the light source for capturing a three dimensional image by allowing a binary coded pattern which a generating period of grating is adjusted to illuminate to an object.

5. A moiré image capturing apparatus comprising:
   a light source for illuminating light;
   lens means directly connected with the light source for transforming a spot beam of the light source into a slit-beam;
   polygonal reflecting surfaces rotating means for rotating a plurality of reflecting surfaces to reflect the light illuminated by the light source and lens means and thereby form a striped pattern;
   light traveling route probing means for generating a synchronizing signal by probing a traveling route of the light after reflection at the reflecting surfaces of the polygonal reflecting surfaces rotating means; and
   control means for controlling an on/off switching period of the light source and a pitch of the striped pattern according to the synchronizing signal of the light traveling route probing means.

6. A method for capturing a moiré image, the method comprising the steps of:
   transforming a spot beam generated by a light source into a slit-beam;
   allowing the slit-beam to reflect at at least one reflecting surface of a polygonal reflecting surfaces rotating means that rotates at a high speed; and
   allowing a pitch of the slit-beam having reflected at the polygonal reflecting surfaces rotating means to change by adjusting an on/off switching period of the light source.

* * * * *